United States Patent
Bogan, Jr.

(10) Patent No.: US 9,486,788 B2
(45) Date of Patent: Nov. 8, 2016

(54) PREPARATION OF PROPANE OXIDATION CATALYSTS

(71) Applicant: Rohm and Haas Company, Philadelphia, PA (US)

(72) Inventor: Leonard E. Bogan, Jr., Midland, MI (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/430,662

(22) PCT Filed: Sep. 5, 2013

(86) PCT No.: PCT/US2013/058201
§ 371 (c)(1),
(2) Date: Mar. 24, 2015

(87) PCT Pub. No.: WO2014/051957
PCT Pub. Date: Apr. 3, 2014

(65) Prior Publication Data
US 2015/0246344 A1 Sep. 3, 2015

Related U.S. Application Data

(60) Provisional application No. 61/707,059, filed on Sep. 28, 2012.

(51) Int. Cl.
| | |
|---|---|
| *B01J 21/00* | (2006.01) |
| *B01J 23/00* | (2006.01) |
| *B01J 23/06* | (2006.01) |
| *B01J 23/08* | (2006.01) |
| *B01J 23/10* | (2006.01) |
| *B01J 23/12* | (2006.01) |
| *B01J 23/14* | (2006.01) |
| *B01J 23/16* | (2006.01) |
| *B01J 23/28* | (2006.01) |
| *B01J 23/48* | (2006.01) |
| *B01J 23/70* | (2006.01) |
| *B01J 23/76* | (2006.01) |
| *B01J 37/00* | (2006.01) |
| *B01J 37/08* | (2006.01) |
| *B01J 37/12* | (2006.01) |
| *B01J 27/057* | (2006.01) |
| *B01J 37/03* | (2006.01) |
| *B01J 35/00* | (2006.01) |
| *B01J 35/02* | (2006.01) |

(52) U.S. Cl.
CPC .......... *B01J 27/0576* (2013.01); *B01J 35/002* (2013.01); *B01J 35/02* (2013.01); *B01J 37/033* (2013.01); *B01J 37/08* (2013.01); *B01J 2523/00* (2013.01)

(58) Field of Classification Search
CPC .......... B01J 6/001; B01J 21/00; B01J 23/00; B01J 23/06; B01J 23/08; B01J 23/10; B01J 23/12; B01J 23/14; B01J 23/16; B01J 23/28; B01J 23/48; B01J 23/70; B01J 23/76; B01J 37/00; B01J 37/08; B01J 37/12
USPC ................................. 502/305–355
See application file for complete search history.

(56) References Cited

U.S. PATENT DOCUMENTS

| | | | | |
|---|---|---|---|---|
| 4,065,468 | A * | 12/1977 | Grasselli | B01J 23/24 502/206 |
| 4,170,570 | A * | 10/1979 | Zagata | B01J 23/28 502/211 |
| 4,918,214 | A * | 4/1990 | Brazdil, Jr. | B01J 23/002 558/319 |
| 5,049,692 | A | 9/1991 | Hatano et al. | |
| 5,380,933 | A | 1/1995 | Ushikubo et al. | |
| 5,994,580 | A | 11/1999 | Takahashi et al. | |
| 6,036,880 | A | 3/2000 | Komada et al. | |
| 6,060,422 | A | 5/2000 | Takahashi et al. | |
| 6,063,728 | A | 5/2000 | Hinago et al. | |
| 6,291,393 | B1 | 9/2001 | Tu et al. | |
| 6,346,647 | B2 | 2/2002 | Tu et al. | |
| 6,407,280 | B1 | 6/2002 | Chaturvedi et al. | |
| 6,504,053 | B1 | 1/2003 | Chaturvedi et al. | |
| 6,610,629 | B2 | 8/2003 | Hinago et al. | |
| 6,642,173 | B2 * | 11/2003 | Bogan, Jr. | B01J 23/002 502/311 |
| 6,700,015 | B2 | 3/2004 | Chaturvedi et al. | |
| 6,781,017 | B2 | 8/2004 | Machhammer et al. | |
| 6,790,988 | B2 | 9/2004 | Chaturvedi et al. | |
| 6,825,380 | B2 | 11/2004 | Chaturvedi et al. | |

(Continued)

FOREIGN PATENT DOCUMENTS

| | | |
|---|---|---|
| DE | 102009054229 | 3/2014 |
| JP | 2001300311 | 10/2001 |

(Continued)

OTHER PUBLICATIONS

Havecker, et al., "Surface chemistry of phase-pure M1 MoVTeNb oxide during operation in selective oxidation of propane to acrylic acid", Journal of Catalysis, 285, 2012, p. 48-60.

(Continued)

*Primary Examiner* — Patricia L Hailey
(74) *Attorney, Agent, or Firm* — Edward L. Brant

(57) ABSTRACT

A process for preparing a propane oxidation catalyst, the process comprising pre-calcining a catalyst precursor in a precalcining zone in an oxygen-containing gas, then feeding an oxygen-free gas to a purging zone until the gas exiting the zone is substantially free of oxygen, and calcining the pre-calcined precursor to obtain the catalyst.

10 Claims, No Drawings

(56) References Cited

U.S. PATENT DOCUMENTS

| | | | |
|---|---|---|---|
| 6,841,699 B2* | 1/2005 | Bogan, Jr. | B01J 23/002 502/311 |
| 7,009,075 B2 | 3/2006 | Hazin | |
| 7,332,625 B2 | 2/2008 | Dubois et al. | |
| 7,495,121 B2 | 2/2009 | Hibst et al. | |
| 7,635,786 B2* | 12/2009 | Shin | C07C 51/215 562/532 |
| 7,875,571 B2 | 1/2011 | Bogan, Jr. et al. | |
| 2002/0038052 A1* | 3/2002 | Bogan | B01J 23/002 562/542 |
| 2002/0161256 A1 | 10/2002 | Bogan, Jr. et al. | |
| 2004/0082190 A1 | 4/2004 | Borgmeier et al. | |
| 2004/0116284 A1* | 6/2004 | Stevenson | B01J 23/002 502/311 |
| 2004/0147393 A1 | 7/2004 | Hibst et al. | |
| 2007/0179042 A1* | 8/2007 | Pessoa Cavalcanti | B01J 23/002 502/34 |
| 2009/0042723 A1 | 2/2009 | Wang et al. | |

FOREIGN PATENT DOCUMENTS

| | | |
|---|---|---|
| WO | 2006058998 | 6/2006 |
| WO | 2009106474 | 9/2009 |

OTHER PUBLICATIONS

Deng, et al., "Highly active Mo—V—Te—Nb—O catalysts obtained by eliminating surface Te0 for selective oxidation of propane to acrylic acid", React. Kinet. Catal. Lett. 2009, 97, p. 225-232.

Ueda, et al., "Structural organization of catalytic functions in Mo-based oxides for propane selective oxidation", Catalysis Today, 96, 2004, p. 235-240.

* cited by examiner

PREPARATION OF PROPANE OXIDATION CATALYSTS

CROSS-REFERENCE TO RELATED APPLICATIONS

This application claims priority from provisional application Ser. No. 61/707,059, filed Sep. 28, 2012, which is incorporated herein by reference in its entirety.

BACKGROUND OF THE INVENTION

The invention relates to the preparation of metal oxide catalysts that are useful in the oxidation of propane.

Thousands of tons of acrylic acid and acrylonitrile are produced from propylene each year. The lower price of propane relative to propylene made the development of a process starting with propane very attractive. Accordingly, a MoVTeNb mixed-metal oxide catalyst that gives good yields of acrylonitrile and acrylic acid from propane was developed and has been the subject of a significant amount of research.

In a typical catalyst synthesis, water-soluble metal precursor compounds are dissolved in water, and the resulting mixture is dried to form a solid precursor mixture of metal compounds. The precursor is heated to an intermediate temperature in air to decompose and drive off water, ammonia, and organics, and then is heated under an inert (oxygen-free) atmosphere to a higher temperature to form the mixed-metal oxide catalyst.

The Mo—V—Te—Nb—O system is complex, with multiple phases kinetically accessible under the conditions required to prepare the best catalysts. An orthorhombic phase, called M1 in the literature, has the $Cs_{0.7}(Nb_{2.7}W_{2.3})O_{14}$, structure. This phase is generally acknowledged to be necessary to activate propane. A pseudo-hexagonal phase, called M2, has a modified hexagonal tungsten bronze (HTB) structure. In addition to these, many preparations also include an undesirable $M_5O_{14}$ phase. An intergrowth tungsten bronze (ITB) phase having the formula $TeM_5O_{16}$ is sometimes seen as well. Thus, it is difficult to prepare a material having only an M1 phase on a commercial scale.

In view of the unsettled state of the art, it would be desirable to have a improved process for preparing a MoVTeNb mixed-metal oxide catalyst.

SUMMARY OF THE INVENTION

The invention is such a process for preparing a propane oxidation catalyst, the process comprising: (a) preparing a catalyst precursor; (b) pre-calcining the catalyst precursor in a precalcining zone in an oxygen-containing gas at a temperature of less than 330° C. to form a pre-calcined precursor; then (c) feeding an oxygen-free gas to the pre-calcined precursor in a purging zone until the gas exiting the purging zone is substantially free of oxygen, wherein the temperature of the purging zone is less than 330° C., and (d) calcining the pre-calcined precursor to obtain the catalyst.

It was unexpectedly found that precalcination at a temperature of less than 330° C., followed by an oxygen purging step, mitigates or prevents the formation of the undesirable $M_5O_{14}$, phase.

DETAILED DESCRIPTION OF THE INVENTION

As used herein, "a," "an," "the," "at least one," and "one or more" are used interchangeably. The terms "comprises," "includes," and variations thereof do not have a limiting meaning where these terms appear in the description and claims. Thus, for example, an aqueous composition that includes particles of "a" hydrophobic polymer can be interpreted to mean that the composition includes particles of "one or more" hydrophobic polymers.

Also herein, the recitations of numerical ranges by endpoints include all numbers subsumed in that range (e.g., 1 to 5, includes 1, 1.5, 2, 2.75, 3, 3.80, 4, 5, etc.). For the purposes of the invention, it is to be understood, consistent with what one of ordinary skill in the art would understand, that a numerical range is intended to include and support all possible subranges that are included in that range. For example, the range from 1 to 100 is intended to convey from 1.01 to 100, from 1 to 99.99, from 1.01 to 99.99, from 40 to 60, from 1 to 55, etc.

Also herein, the recitations of numerical ranges and/or numerical values, including such recitations in the claims, can be read to include the term "about." In such instances the term "about" refers to numerical ranges and/or numerical values that are substantially the same as those recited herein.

Unless stated to the contrary, or implicit from the context, all parts and percentages are based on weight and all test methods are current as of the filing date of this application. For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

The process of the invention employs a catalyst precursor, an oxygen-containing gas, and an oxygen-free gas.

The term "oxygen-containing gas," as used herein, refers to any gas comprising from 0.01% up to 100% oxygen, including, for example, air. While the oxygen-containing gas may be pure oxygen gas, it is usually more economical and practical to use an oxygen-containing gas such as air. Mixtures of oxygen-containing gases may be employed.

The term "oxygen-free gas," as used herein, refers to any gas that is substantially free of oxygen, including, for example, nitrogen, argon and helium. Nitrogen is preferred due to its relatively low cost and ready availability. Mixtures of oxygen-free gases may be employed.

The catalyst precursor can be prepared by methods known to those skilled in the art. For example, the catalyst precursor can be formed according to the methods described in, e.g., U.S. Pat. No. 6,825,380.

The preparation employs at least one metal oxide precursor. A metal oxide precursor is a metal-containing substance, e.g., a metal complex and/or a metal salt, that can be oxidized or decomposed to form a metal oxide, e.g., by calcination. The catalyst precursor may be prepared in the following manner. In a first step, a slurry or solution may be formed by admixing metal compounds, preferably at least one of which contains oxygen, and at least one solvent in appropriate amounts to form the slurry or solution. A solution is preferred. The metal compounds advantageously contain the elements A, N, X, Z and O as defined herein, as well as vanadium.

Suitable solvents include water; alcohols such as, for example, methanol, ethanol, propanol, and diols; and other polar solvents. Water is preferred. The water can be any water that is suitable for use in chemical synthesis including, without limitation, distilled water and deionized water. The amount of water is preferably an amount sufficient to keep the metal compounds substantially in solution long enough to avoid or minimize compositional and/or phase segregation. Thus, the amount of water employed will vary according to the amounts and solubilities of the metal compounds employed.

Once the slurry or solution is formed, the solvent is removed, by any suitable method known in the art, to form a catalyst precursor. Such methods include, without limitation, vacuum drying, freeze drying, spray drying, rotary evaporation and air drying. Vacuum drying is generally performed of pressures ranging from 10 to 500 mHg. Freeze drying typically entails freezing the solution or slurry using, for instance, liquid nitrogen and drying the frozen slurry or solution under vacuum. Spray drying is generally performed under an inert atmosphere such as nitrogen or argon, with an inlet temperature ranging from 125° C. to 200° C., and an outlet temperature ranging from 75° C. to 150° C. Rotary evaporation is generally performed at a temperature of from 25° C. to 90° C. at a pressure of from 10 to 760 mmHg. Air drying may be effected at temperatures ranging from 25° C. to 90° C. Rotary evaporation or spray drying are generally preferred.

The catalyst precursor is pre-calcined at a temperature of less than 330° C. to obtain a pre-calcined precursor. The pre-calcining step is conducted in an oxygen containing atmosphere. Pre-calcining can be performed using equipment and methods well-known in the art. The temperature of the pre-calcination is a maximum temperature, i.e. no point in the pre-calcination equipment is higher than the specified temperature. The pre-calcining temperature can be less than 310° C., less than 300° C., less than 290° C., or less than 280° C. The time of precalcination is not particularly critical. In various embodiments of the invention, the time of pre-calcination is at least 4 hours, at least 5 hours, at least 6 hours, at least 7 hours, or at least 8 hours. In one embodiment of the invention, the precalcination time is from 4 to 8 hours.

A purging step follows the precalcination step. This step comprises feeding an oxygen-free gas to the pre-calcined precursor until the gas exiting the purging zone is substantially free of oxygen. As used herein, the term "substantially free of oxygen" means that there is less than 100 ppm of oxygen present in the gas exiting the purging zone. In various embodiments of the invention, the amount of oxygen present in the gas exiting the purging zone is less than 50 ppm, less than 20 ppm, less than 5 ppm, or less than 1 ppm. Oxygen analyzers are commercially available. The temperature of the purging zone is less than 330° C. The purging temperature can be less than 310° C., less than 300° C., less than 290° C., or less than 280° C.

The purging zone can be the same zone as the precalcining zone. In one embodiment of the invention, the purging zone is different than the precalcining zone. A wide variety of equipment can be used as either the purging zone or the precalcining zone. The choice of equipment can be made according to criteria known to those skilled in the art.

The pre-calcined precursor is calcined according to methods well known to those skilled in the art to form the catalyst. See, e.g., U.S. Pat. No. 6,825,380.

The general formula for the MMO catalyst is $A_aV_bN_cX_dZ_eO_f$, wherein A is at least one element selected from the group consisting of Mo and W, N is at least one element selected from the group consisting of Te and Sb, X is at least one element selected from the group consisting of Nb, Ta, Ti, Al, Zr, Cr, Mn, Fe, Ru, Co, Rh, Ni, Pt, Sb, Bi, B, In, As, Ge, Sn, Hf, Pb, P, Pm, Eu, Gd, Dy, Ho, Er, Tm, Yb and Lu, and Z is at least one element selected from the group consisting of Zn, Ga, Ir, Sm, Pd, Au, Ag, Cu, Sc, Y, Pr, Nd and Tb; and wherein, when a=1, b=0.01 to 1.0, c=0.01 to 1.0, d=0.01 to 1.0, e=0 to 0.1 and f is dependent on the oxidation state of the other elements. In one embodiment, the MMO is promoted, i.e. Z is present, preferably with a value of e from 0.001 to 0.1. Promoted MMO catalysts are described, e.g., in U.S. Pat. Nos. 6,825,380; 6,790,988; 6,700,015; 6,504,053 and 6,407,280. In another embodiment, Z is absent (e=0).

Preferably, when a=1, b=0.1 to 0.5, c=0.05 to 0.5, d=0.01 to 0.5 and e=0.001 to 0.02. More preferably, when a=1, b=0.15 to 0.45, c=0.05 to 0.45, d=0.05 to 0.2 and e=0.005 to 0.015. However, in an alternative embodiment, when a=1 and e=0, b=0.01 to 1.0, c=0.01 to 1.0 and d=0.01 to 1.0; preferably, when a=1 and e =0, b=0.1 to 0.5, c=0.05 to 0.5 and d=0.01 to 0.5; more preferably, when a=1 and e=0, b=0.15 to 0.45, c=0.05 to 0.45 and d=0.05 to 0.2. Moreover, in a further alternative embodiment, e=0.005 to 0.1; more preferably, e=0.01 to 0.05. The value of f, i.e. the amount of oxygen present, is dependent on the oxidation state of the other elements in the catalyst. However, f is typically in the range of from 3 to 4.7. Preferably, A is Mo. Preferably, N is Te. Preferably, X is Nb or Ta; and most preferably, X is Nb. In one preferred embodiment of the invention, the catalyst is $Mo_aV_bTe_cNb_dZ_eO_f$. Preferably, Z is Pd. In another embodiment of the invention, the catalyst is $Mo_aV_bTe_cNb_dO_f$, (e=0).

Specific Embodiments of the Invention

The following examples are given to illustrate the invention and should not be construed as limiting its scope.

Phase Composition Determination Method

The weight percentage of $M_5O_{14}$ phase is determined from the ratio of powder x-ray diffraction (XRD) peak intensities at 24.8° and 25.2° two theta according to the correlation Wt. % $M_5O_{14}$=100×wt. $M_5O_{14}$ phase/total=−7.0767+ [20.55×($I_{24.8}/I_{25.2}$)]

This formula was developed based on blending pure phases and correlating the weight ratios of the known blends to the ($I_{24.8}/I_{25.2}$) intensity ratio. The following values are used to demonstrate the calculation, based on values for the catalyst of Example 1.

$I_{24.8}$=510
$I_{25.2}$=1191
$I_{24.8}/I_{25.2}$=0.4282
% $M_5O_{14}$ phase=−7.0767+(20.55×0.4282)=1.72

All results are ±2% (i.e. % $M_5O_{14}$ phase=1.72±2%).

Preparation of Catalyst Precursor

Ammonium heptamolybdate tetrahydrate (1400 g), telluric acid (384.2 g) ammonium metavanadate (264.3 g), and conc. nitric acid (323.2 g) are dissolved sequentially in water (7850 g) at 70° C. to make solution A. In a separate tank, ammonium niobium oxalate (613.7 g) and oxalic acid dihydrate (155.4 g) are dissolved in water (7065 g) at ambient temperature to make solution B. In a third tank, solution A (4500 g) and solution B (3450 g) are mixed, and this mixture is fed to a spray-drier to yield a green-orange powder (977 g).

The powder is subjected to an initial heat treatment in air to remove materials other than metal oxides (primarily water, ammonia, and oxalic acid) prior to calcination. The green-orange powder (300 g) is heated in a ceramic dish in a box furnace under static air for one hour at 275° C. (ramp rate 10° C./min) to yield about 205 g of olive green powder. This procedure is repeated many times to treat all of the powder. The bulk elemental composition of the precursor, measured by x-ray fluorescence (XRF), is $Mo_{0.70}V_{0.19}Te_{0.17}Nb_{0.12}$.

Example 1

In a Lindberg/Blue M Mini-Mite tube furnace, precursor (7.0 g) is calcined in a one-inch diameter quartz tube. The furnace is mounted so that the long axis of the tube is oriented vertically, and the bed of powder is positioned within the (previously determined) uniform temperature region of the furnace. Under a flow of air of 100±10 sccm, the furnace temperature is ramped from ambient to 275° C. at 10° C./min, and held at that temperature for eight hours. The gas is switched to nitrogen (same flow rate), and the temperature is held at 275° C. for an additional eight hours to purge oxygen. The temperature is then ramped to 615° C. at 2° C./min and held at 615° C. for two hours, then the furnace is allowed to cool to ambient temperature while under nitrogen flow. This yields 6.45 g of a black powder. The composition is determined by XRF to be $Mo_{0.69}V_{0.19}Te_{0.17}Nb_{0.12}$. Determination of % $M_5O_{14}$ phase in the catalyst by XRD gave 1.7±2% $M_5O_{14}$ phase, or essentially none.

Comparative Experiment 1 (Not an Embodiment of the Invention)

Precursor (8.3 g) is charged to a tube as in Example 1. Under a flow of air (100±10 sccm), the temperature is ramped to 275° C. at 10° C./min, held at 275° C. for one hour, ramped to 330° C. at 2° C./min, held at 330° C. for one hour, the gas is switched to nitrogen, the temperature ramped to 615° C. at 2° C./min, and held at 615° C. for two hours. The furnace is allowed to cool to ambient temperature while under nitrogen flow. This yields 7.7 g of a gray-black solid. The composition is determined by XRF to be $Mo_{0.71}V_{0.17}Te_{0.19}Nb_{0.12}$. The XRD powder pattern matched $M_5O_{14}$.

Comparative Experiment 2 (Not an Embodiment of the Invention)

The procedure of Example 1 is followed, except that 12.0 g precursor are used, and after switching to a nitrogen gas feed at 275° C., the temperature is immediately ramped to 615° C. at 2° C./min. This yields 11.2 g of a black solid. The composition is determined by XRF to be $Mo_{0.70}V_{0.18}Te_{0.17}Nb_{0.12}$. The catalyst contains 16% $M_5O_{14}$ phase, showing the effect of even small amounts of oxygen at 300° C.

Surprisingly, the data shows that process of the invention reduces or eliminates the $M_5O_{14}$ phase.

What is claimed is:

1. A process for preparing a propane oxidation catalyst, the process comprising: (a) preparing a catalyst precursor; (b) pre-calcining the catalyst precursor in a precalcining zone in an oxygen-containing gas at a temperature of less than 330° C. to form a pre-calcined precursor; then (c) feeding an oxygen-free gas to the pre-calcined precursor in a purging zone until the gas exiting the purging zone is substantially free of oxygen, wherein the temperature of the purging zone is less than 330° C., and (d) calcining the pre-calcined precursor to obtain the catalyst.

2. The process of claim 1 wherein the catalyst comprises less than 4% of M5O14 phase.

3. The process of claim 1 wherein the catalyst comprises less than 2% of M5O14 phase.

4. The process of claim 1 wherein the oxygen-free gas comprises primarily nitrogen.

5. The process of claim 1 wherein the temperature of at least one of the precalcining zone or the purging zone is less than 310° C.

6. The process of claim 1 wherein the temperature of at least one of the precalcining zone or the purging zone is less than 290° C.

7. The process of claim 1 wherein the temperature of at least one of the precalcining zone or the purging zone is less than 280° C.

8. The process of claim 1 wherein step (b) is continued until the weight of the precursor stabilizes to obtain a pre-calcined precursor.

9. The process of claim 1 wherein the catalyst is represented by the formula AaVbNcXdZeOf wherein A is at least one element selected from the group consisting of Mo and W, N is at least one element selected from the group consisting of Te and Sb, X is at least one element selected from the group consisting of Nb, Ta, Ti, Al, Zr, Cr, Mn, Fe, Ru, Co, Rh, Ni, Pt, Sb, Bi, B, In, As, Ge, Sn, Hf, Pb, P, Pm, Eu, Gd, Dy, Ho, Er, Tm, Yb and Lu, and Z is at least one element selected from the group consisting of Zn, Ga, Ir, Sm, Pd, Au, Ag, Cu, Sc, Y, Pr, Nd and Tb; and wherein, when a=1, b=0.01 to 1.0, c=0.01 to 1.0, d=0.01 to 1.0, e=0 to 0.1 and f is dependent on the oxidation state of the other elements.

10. The process of claim 1 wherein A=Mo, N=Te, and X=Nb.

* * * * *